UNITED STATES PATENT OFFICE.

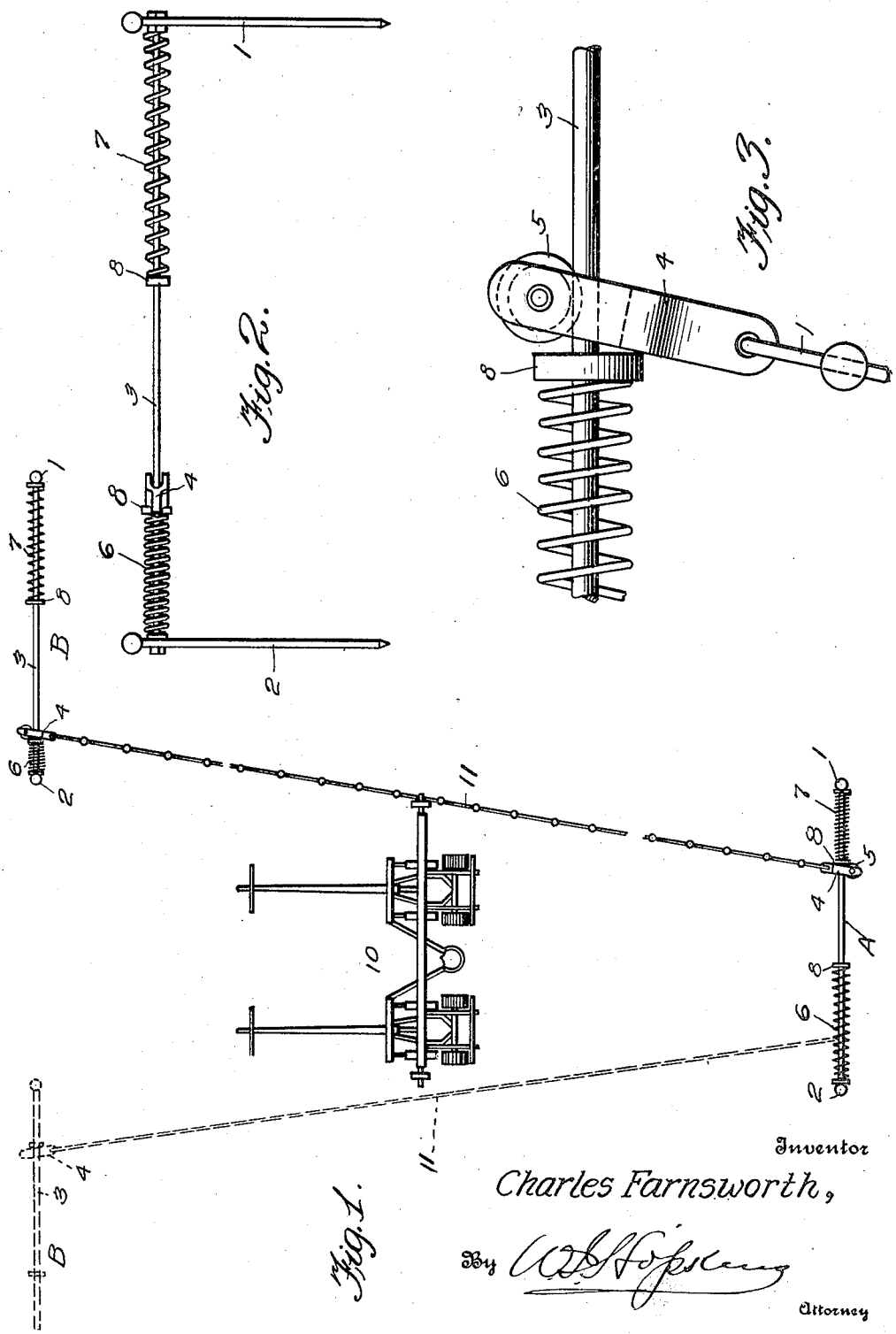

CHARLES FARNSWORTH, OF SANBORN, IOWA.

ANCHOR FOR CHECKROW-WIRES.

1,324,240.  Specification of Letters Patent.  Patented Dec. 9, 1919.

Application filed March 28, 1919. Serial No. 285,728.

*To all whom it may concern:*

Be it known that I, CHARLES FARNSWORTH, a citizen of the United States, residing at Sanborn, in the county of O'Brien and State of Iowa, have invented certain new and useful Improvements in Anchors for Checkrow-Wires, of which the following is a specification.

This invention relates to anchors for check row wires for planters, and has for its objects the uniform and accurate spacing by the planter at the ends of the rows planted while keeping the check wire taut between the anchors at opposite ends of the field being planted, which objects I obtain by providing for a wide movement laterally of the check wire at its ends under spring tension, thus avoiding the excessive strain on the check wire at the ends of the rows by its tangential course with relation to the line of movement of the planter at the ends of the rows being planted, which tangential course of the check wire with relation to the planter results in the premature tripping of the planting mechanism of the planter, thereby shortening the distance between the hills of grain planted at the ends of the rows, making cultivation of the field later at right angles to the course of planting difficult. Further, provision is made for deviation from a straight line in the course of planting which may be occasioned by an obstruction in the field, such for instance as a boulder or an irregular fence line and yet insure practically absolutely rectangular planting in cross section.

In the drawings which form a part of this specification and in which like numerals of reference indicate like parts in the several views.

Figure I is a plan, view, of my anchor with the check wire engaged by the planter.

Fig. II is an elevation of my device showing one of the tension springs partially compressed.

Fig. III is a detailed view showing means for attaching the check wire.

Referring to drawings A and B indicate check row wire anchors placed at opposite ends of a field; 1 and 2 indicate standards which are preferably made of iron and sharpened at their ends in order that they may be readily driven into the ground; 3 is a round track which is supported in an elevated position with relation to the ground by standards 1 and 2 and upon which clevis 4 is adapted to travel through the medium of roller 5 which has a grooved periphery, said groove conforming to the contour of track 3; clevis 4 carries at its outer portion securing means for attaching the check row wire thereto and which means may be of any desired type; 6 and 7 are coiled springs carried by track 3, which are adapted to become compressed against the standards 1 and 2 respectively by the movement of clevis 4 to the right or left on track 3; 8 are loose slip washers, intermediate clevis 4 and springs 6 and 7 and are for the purpose of receiving and transmitting to said springs the lateral pressure of clevis 4 when moved to the right or left along track 3 as may be the case; 9 is the check row wire; 10 represents a four row planter generally.

The operation of my device is as follows: Referring to the drawings we will let it be assumed that the planting of a field of corn for instance, has been started and that the planter 10 is in the course of its first trip from the south end of the field to the north end thereof. It will be observed that by reason of the tension on spring 7 having been somewhat released by the forward movement of the planter 10 has pushed clevis 4 toward the center of the track 3 of anchor A, while spring 6 of anchor B at the opposite end of the field has become partially compressed by reason of clevis 4 having been forced against it by the progress of planter 10. When the planter 10 finishes its course anchor B will be shifted so as to assume the same relative position at the left of anchor A as it now has at the right thereof when the check wire will be in position to start the planting to the south end of the field.

I claim:

1. A track spaced from the ground, a movable member carried by said track, means for spacing said track from the ground, said means being adapted to be driven thereinto, springs carried by said track intermediate said means and movable member and washers interposed between the ends of said springs and said member.

2. A track spaced from the ground, stakes for holding said track in spaced relation to the ground, a pulley capable of reciprocal movement on said track and springs adapted to practically center said pulley on said track when at rest.

In testimony whereof I affix my signature.

CHARLES FARNSWORTH.